(12) United States Patent
Lubanski

(10) Patent No.: US 8,119,914 B2
(45) Date of Patent: Feb. 21, 2012

(54) SUBSTANTIALLY TRANSPARENT CABLE PROTECTOR AND CABLE PROTECTION SYSTEM

(75) Inventor: Thomas M. Lubanski, Claremont, CA (US)

(73) Assignee: Checkers Industrial Products, LLC, Compton, CO (US)

(*) Notice: Subject to any disclaimer, the term of this patent is extended or adjusted under 35 U.S.C. 154(b) by 602 days.

(21) Appl. No.: 12/177,714

(22) Filed: Jul. 22, 2008

(65) Prior Publication Data
US 2010/0018742 A1    Jan. 28, 2010

(51) Int. Cl.
*H02G 3/04* (2006.01)
*H02G 3/30* (2006.01)

(52) U.S. Cl. ........ 174/97; 174/72 C; 174/101; 174/68.1; 14/69.5; 104/275

(58) Field of Classification Search .................. 174/101, 174/135, 97, 50, 70 R, 72 C, 99 R, 68.1, 174/70 C, 95, 481, 482, 484; 220/3.2, 3.3; 248/74.1, 74.2, 68.1; 14/69.5; 104/275; 138/103, 105, 106, 110, 115, 157; D13/155; 439/120, 203, 212, 216; 52/220.5
See application file for complete search history.

(56) References Cited

U.S. PATENT DOCUMENTS

| | | | | |
|---|---|---|---|---|
| 4,775,121 A * | 10/1988 | Carty | ............................ | 248/68.1 |
| 5,095,822 A * | 3/1992 | Martin | ........................... | 104/275 |
| 5,224,674 A * | 7/1993 | Simons | ......................... | 248/68.1 |
| 5,267,367 A * | 12/1993 | Wegmann, Jr. | ................. | 14/69.5 |
| D412,490 S * | 8/1999 | Henry | ........................... | D13/155 |
| 6,022,599 A | 2/2000 | Rietveld et al. | | |
| 6,499,410 B1 * | 12/2002 | Berardi | ......................... | 104/275 |
| 7,145,079 B1 * | 12/2006 | Henry | ........................... | 174/101 |
| 7,203,412 B2 | 4/2007 | Moore | | |
| 7,309,836 B2 * | 12/2007 | Lubanski | ...................... | 174/101 |
| 7,531,746 B2 * | 5/2009 | Henry | ........................... | 174/68.1 |
| 7,810,197 B1 * | 10/2010 | Anthony | ....................... | 174/68.1 |
| 2007/0095560 A1 | 5/2007 | Lubanski | | |

* cited by examiner

*Primary Examiner* — Angel R Estrada
(74) *Attorney, Agent, or Firm* — Holland & Hart

(57) ABSTRACT

A cable protector may comprise an at least partially transparent base member, at least one channel extending between opposing ends of the base member and structured to house at least one cable, and an indicia member positioned within the base member so as to be visible through at least a portion of the base member. The indicia member may comprise advertising indicia, indicia that indicates at least a product name of the cable protector, and/or indicia that indicates a manufacturer of the cable protector.

40 Claims, 8 Drawing Sheets

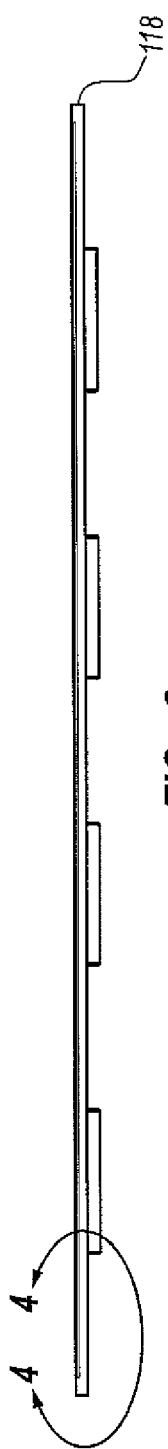
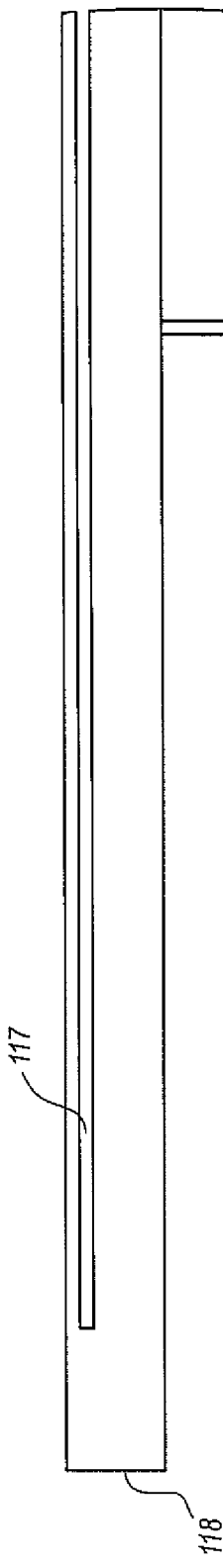
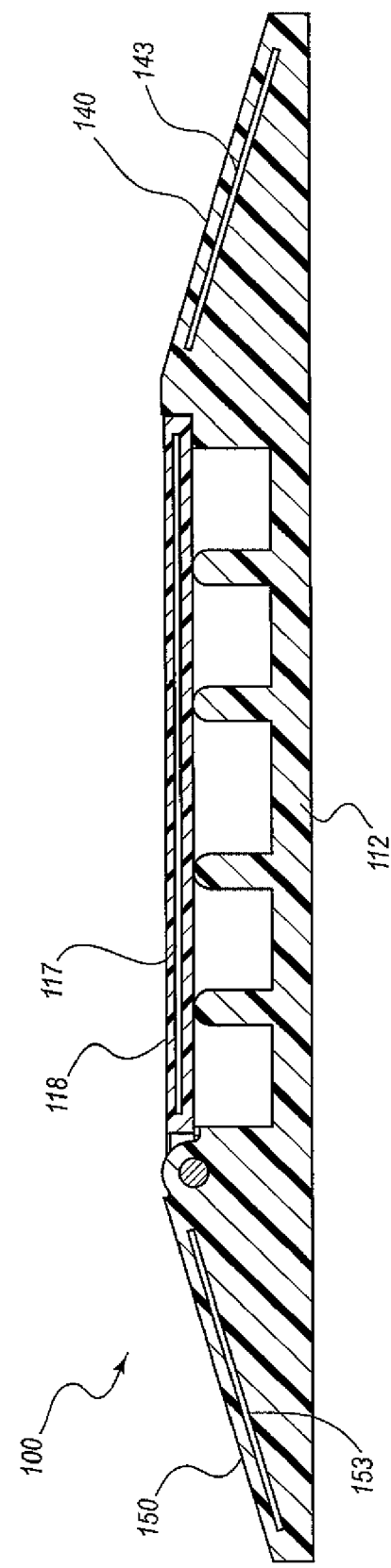
FIG. 3
FIG. 4
FIG. 5

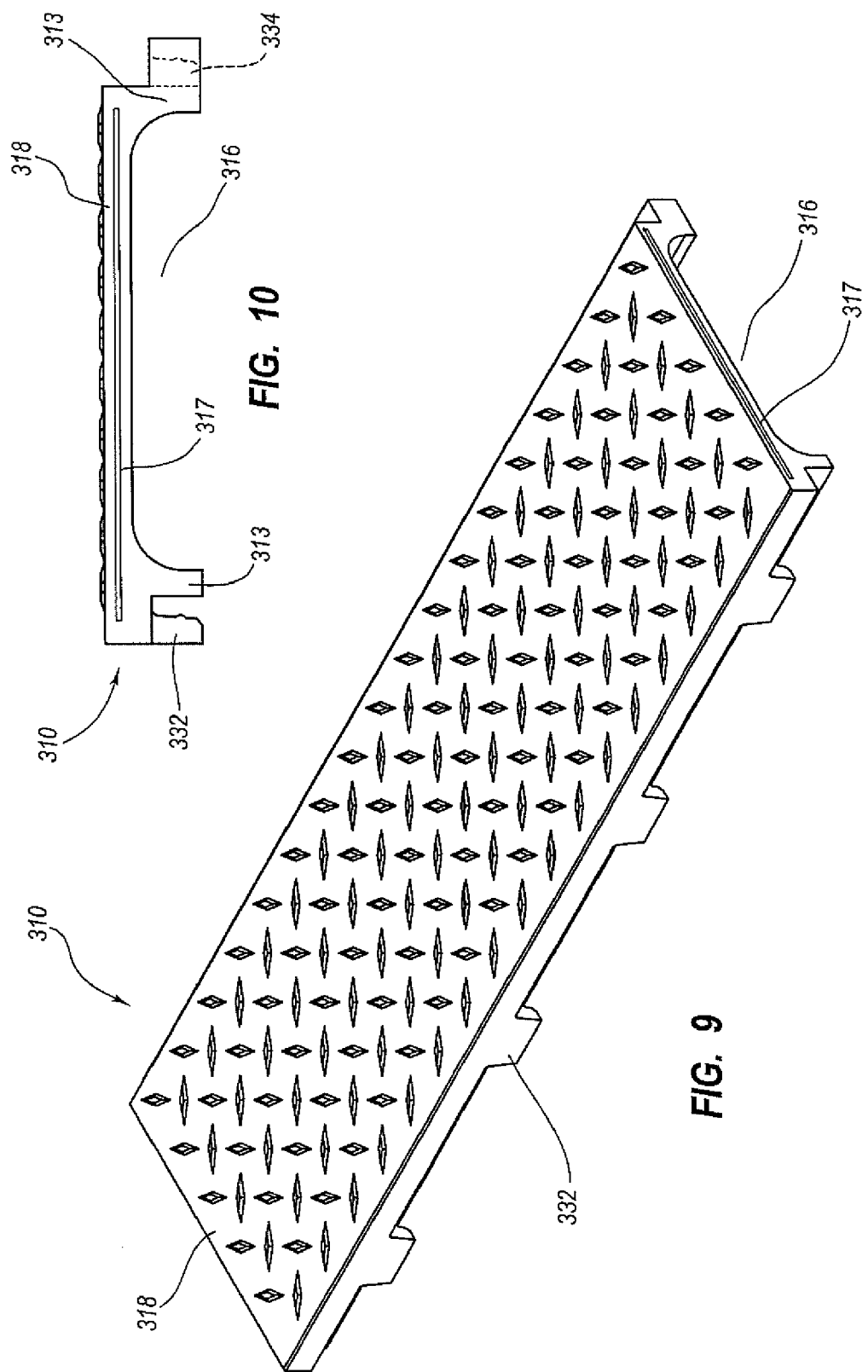

SUBSTANTIALLY TRANSPARENT CABLE PROTECTOR AND CABLE PROTECTION SYSTEM

BACKGROUND

Over the years, various devices and apparatuses have been developed in an effort to protect hoses, cables, wiring, and the like from physical damage. In particular, numerous cable protector designs have been developed to protect cabling extending across walkways, roadways, and construction sites from physical damage caused by pedestrians, vehicular traffic, and other such external elements. Cable protectors have also proven useful in helping to minimize the risk of pedestrians tripping over such cabling.

Conventional cable protectors typically include one or more channels extending in parallel between opposing ends of the cable protector to receive one or more cables. Side ramps may extend laterally outward from, or may be removably attachable to, the sides of the cable protector to allow vehicles and the like to roll over the top of the cable protector. In some cases, these side ramps are configured to have a relatively gradual slope so that a wheelchair, walker, or the like can pass over the cable protector with minimal effort.

SUMMARY

As will be described in greater detail below, the instant disclosure generally relates to substantially transparent cable protectors and cable protection systems capable of housing indicia members. In one embodiment, a cable protector may comprise an at least partially transparent base member, at least one channel extending between opposing ends of the base member and structured to house at least one cable, and an indicia member positioned within the base member so as to be visible through at least a portion of the base member. The indicia member may comprise advertising indicia, indicia that indicates at least a product name of the cable protector, indicia that indicates a manufacturer of the cable protector, or any other suitable indicia.

The base member may comprise a slot for housing the indicia member. The base member may also comprise a recess for housing the indicia member and/or an indicia-covering structure for retaining the indicia member within the recess. The cable protector may also comprise a cover structure pivotally attached to the base member. As with the base member, the cover structure may comprise a slot for housing the indicia member. The cover structure may also comprise a recess for housing the indicia member and/or an indicia-covering structure for retaining the indicia member within the recess.

A side ramp structured to be removably attachable to, or integrally formed with, a side of a cable protector is also disclosed. In one embodiment, this side ramp may comprise an at least partially transparent material, a first side, a second side, a first end, a second end, and an indicia member positioned within the side member so as to be visible through at least a portion of the partially transparent material. The side ramp may also comprise a slot or a recess for housing the indicia member. The side ramp may also comprise an indicia-covering structure for retaining the indicia member within the recess of the side ramp.

A cable protection system is also disclosed. In certain embodiments, this cable protection system may comprise at least one substantially transparent cable protector, at least one channel extending between opposing ends of the cable protector and structured to receive at least one cable, at least one substantially transparent side ramp removably attached to the cable protector, and an indicia member positioned within at least one of the cable protector and the side ramp so as to be visible through at least a portion of at least one of the cable protector and the side ramp.

Features from any of the above-mentioned embodiments may be used in combination with one another in accordance with the general principles described herein. These and other embodiments, features and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 3 is a side view of an exemplary cover structure for a cable protector according to at least one embodiment.

FIG. 4 is an additional side view of the exemplary cover structure illustrated in FIG. 3, taken along line 4-4.

FIG. 5 is an end view of the exemplary cable protection system illustrated in FIG. 1.

FIG. 9 is a top view of an alternative cable protector according to at least one embodiment.

FIG. 10 is an end view of the cable protector illustrated in FIG. 9.

Figure 1:
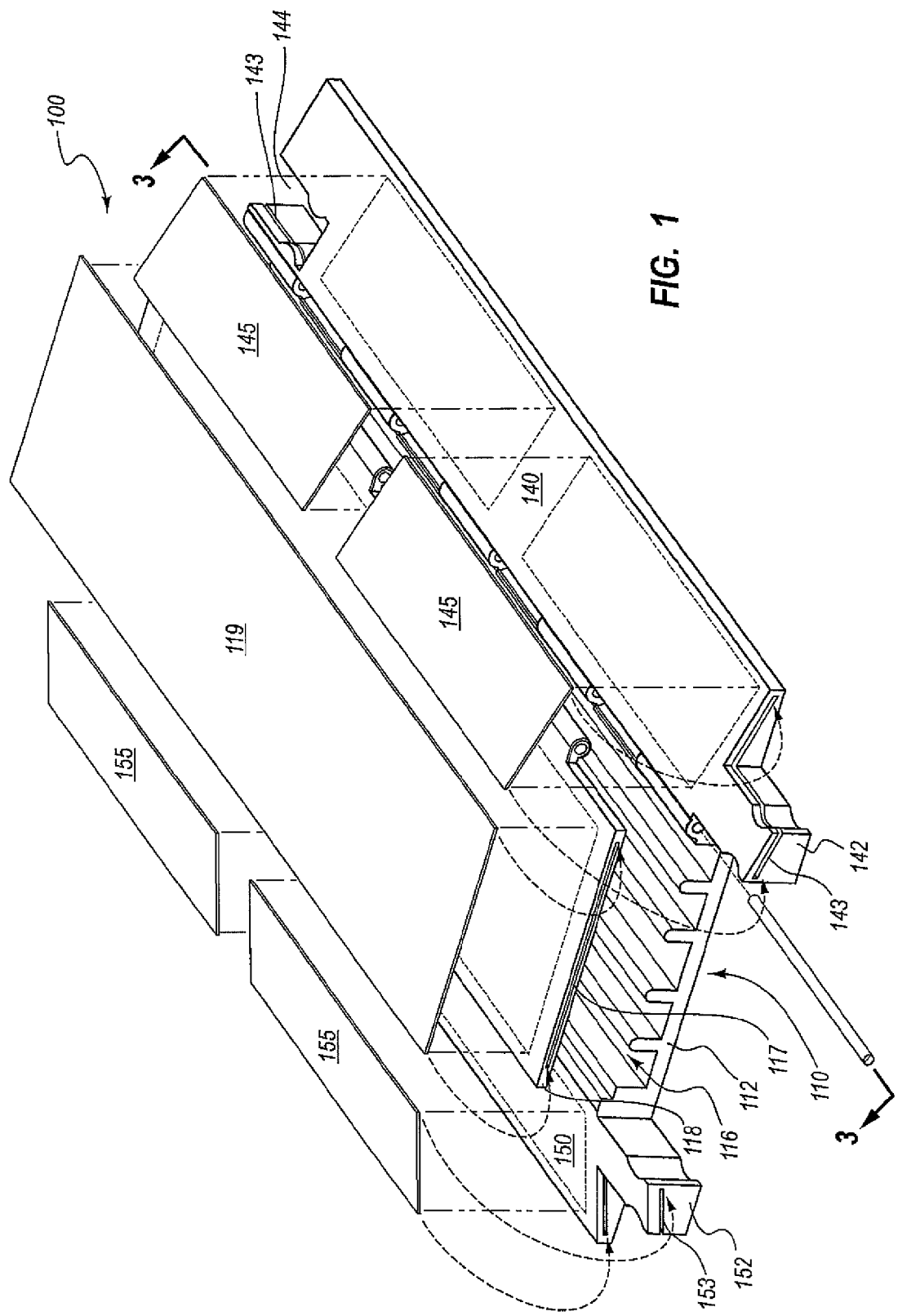
FIG. 1 is an exploded perspective view of an exemplary cable protection system according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, one of skill in the art will understand that the exemplary embodiments described herein are not intended to be limited to the particular forms disclosed. Rather, the instant disclosure covers all modifications, equivalents, and alternatives falling within the scope defined by the appended claims.

DETAILED DESCRIPTION OF EXEMPLARY EMBODIMENTS

Figure 2:
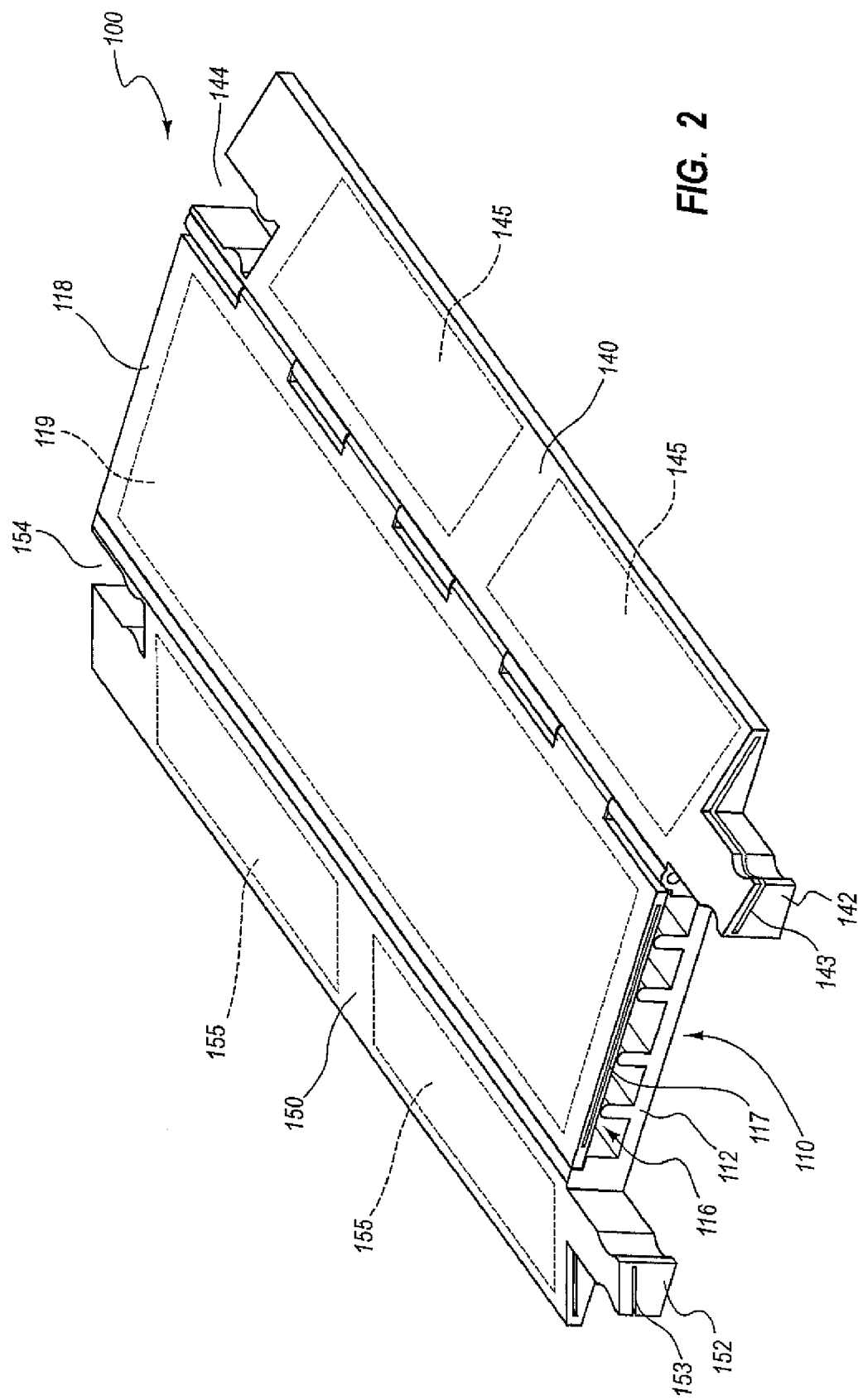
FIG. 2 is an assembled perspective view of the exemplary cable protection system illustrated in FIG. 1.

As will be described in greater detail below, the instant disclosure generally relates to substantially transparent cable protectors and cable protection systems capable of housing indicia members. FIGS. 1-2 are exploded and assembled perspective views, respectively, of a cable protection system 100 according to at least one embodiment. As illustrated in these figures, exemplary cable protection system 100 may comprise a cable protector 110, a first side ramp 140, and a second side ramp 150.

In certain embodiments, cable protector 110 may comprise a base member 112. Base member 112 may be substantially rectangular, as illustrated in FIGS. 1-2, or formed in any number of other shapes or sizes, such as a square or other multi-sided shape. In certain embodiments, base member 112 may comprise one or more channels 116 for housing one or more cables. Numerous forms of cables and wires may be housed within base member 112, including, for example, data cables, hoses, electrical wiring, telephone cables, conduits, optical fibers, pneumatic tubing, plumbing, and any other length of material. In the exemplary embodiments illustrated in FIGS. 1-2, a cover structure 118 may be pivotally attached to base member 112. When in a closed position, cover structure 118 may cover channels 116 to protect any cables housed therein.

In certain embodiments, and as illustrated in FIGS. 1-2, base member 112 may be integrally formed with first side ramp 140 and second side ramp 150. In additional embodiments, base member 112 may be removably attached to first side ramp 140 and second side ramp 150.

In at least one embodiment, first side ramp 140 may comprise one or more male end connectors 142 formed on one of its ends and one or more female end connectors 144 formed on its opposing end. Additionally or alternatively, one or male end connectors 142 and one or more female end connectors 144 may be provided on the same end of first side ramp 140. Although illustrated in FIGS. 1-2 as being formed in a general hourglass shape, end connectors 142 and 144 may be formed in any shape, including, for example, complimentary block-shaped connectors, so-called tongue-and-groove connectors, so-called dogbone-shaped connectors, T-shaped connectors, and the like.

Similar to first side ramp 140, second side ramp 150 may comprise one or more male end connectors 152 and one or more female end connectors 154 formed on its ends. Generally speaking, end connectors 152 and 154 may be formed of any shape or connecting structure, including, for example, hourglass-shaped connectors, complimentary block-shaped connectors, so-called dogbone-shaped connectors, so-called tongue-and-groove connectors, T-shaped connectors, and the like.

As illustrated in FIG. 1-5, in certain embodiments one or more indicia members 119 may be housed or disposed within at least a portion of cable protector 110. Indicia member 119 generally represents any type or form or structure having indicia thereon. Any type or form of indicia may be provided on indicia member 119. Examples of indicia that may be provided on indicia member 119 include, without limitation, advertising indicia, indicia that indicates at least a product name of cable protector 110, indicia that indicates a manufacturer of cable protection 110, or any other desirable indicia.

Indicia member 119 may be formed in any shape or size and of any material or combination of materials. For example, indicia member 119 may be formed of paper, wood, metal, or formed molded of a rigid, high-strength plastic material capable of withstanding repeated loadings and stresses. In certain embodiments, indicia member 119 may represent an advertising sheet or plate having indicia thereon.

Indicia member 119 may be disposed or housed within at least a portion of cable protector 110 in a variety of ways. For example, as illustrated in FIGS. 1-5, indicia member 119 may be positioned or housed with a slot 117 defined in cover structure 118. As with cover structure 118, slot 117 may be formed in any shape or size. In this example, indicia member 119 may be positioned within cover structure 118 by sliding indicia member 119 into slot 117.

As with cable protector 110, in certain embodiments first side ramp 140 and second side ramp 150 may be structured to house one or more indicia members 145 and 155, respectively. For example, at least one indicia member 145 may be positioned or housed within first side ramp 140 by inserting indicia member 145 into a slot 143 defined through at least a portion of first side ramp 140, as illustrated in FIGS. 1, 2, and 5. Similarly, at least one indicia member 155 may be housed within at least a portion of second side ramp 150 by inserting indicia member 155 into a slot 153 defined through at least a portion of second side ramp 150, as illustrated in FIGS. 1, 2, and 5.

In certain embodiments, all or at least a portion of cable protector 110, first side ramp 140, and/or second side ramp 150 may be formed of a substantially or at least partially transparent material. In this embodiment, the indicia on indicia members 119, 145, and 155 housed within cable protector 110, first side ramp 140, and second side ramp 150, respectively, may be seen through the substantially or at least partially transparent material used to form cable protector 110, first side ramp 140, and second side ramp 150.

The exemplary cable protection system 100 illustrated in FIGS. 1-5 may provide a number of advantages. For example, cable protection system 100 may protect indicia members 119, 145, and 155 from damage from external elements while allowing the indicia on indicia members 119, 145, and 155 to be seen through one or more of cable protector 110, first side ramp 140, and second side ramp 150. Similarly, cable protection system 100 may also allow a user to quickly and easily add or remove advertising or other indicia to or from a cable protection system.

Figure 6:
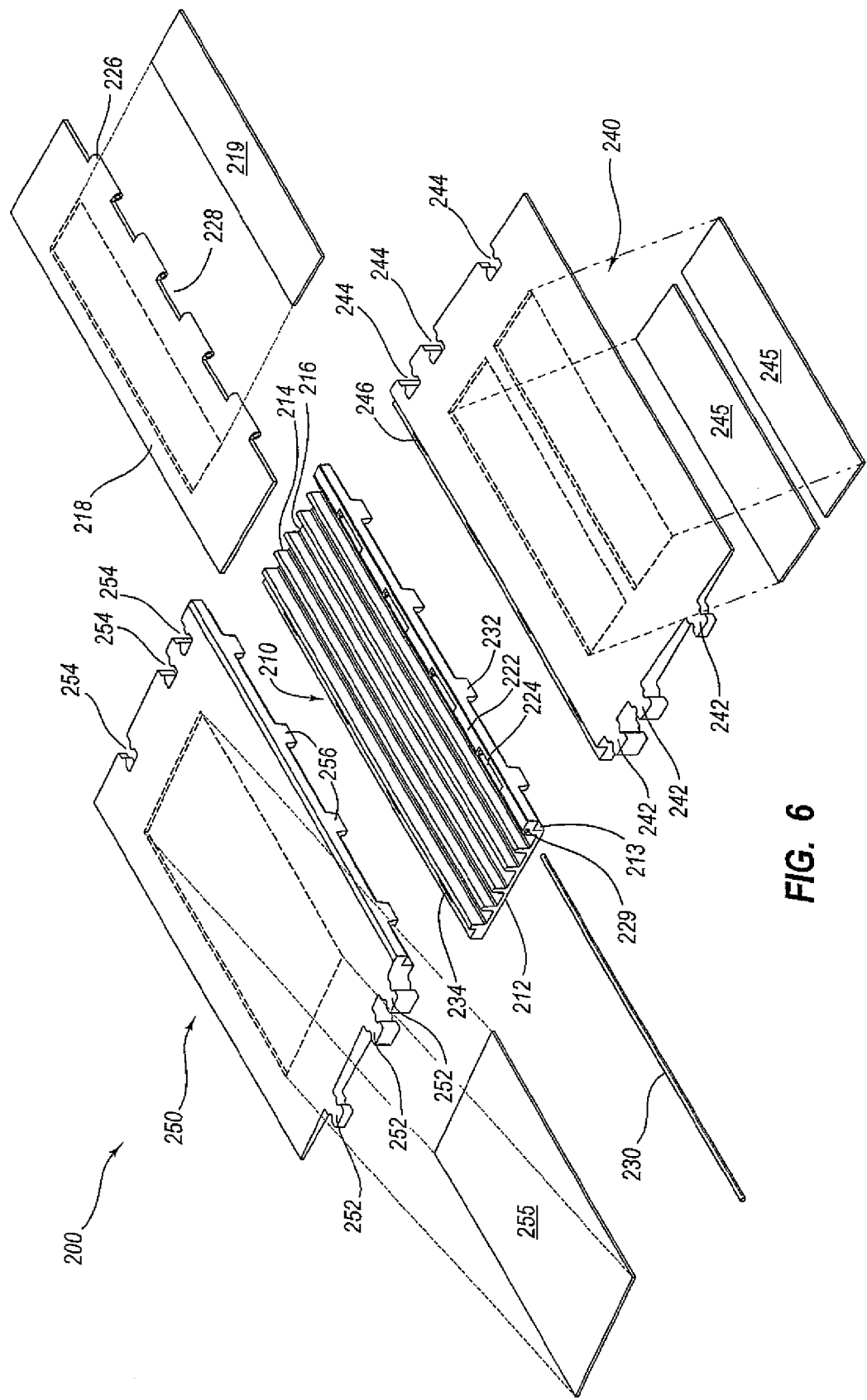
FIG. 6 is an exploded perspective view of an exemplary cable protection system according to an additional embodiment.
Figure 7:
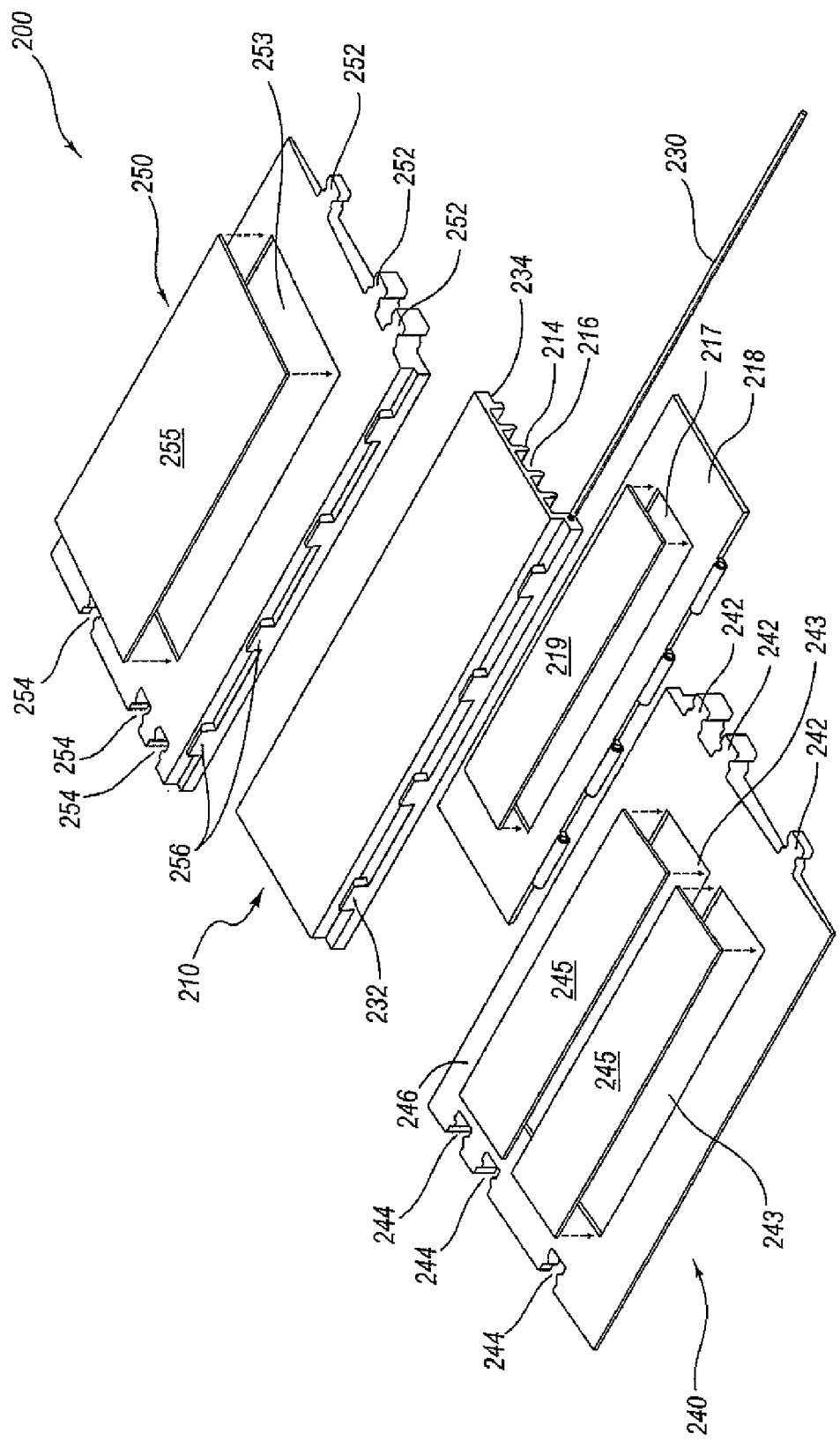
FIG. 7 is a bottom, assembled perspective view of the exemplary cable protection system illustrated in FIG. 6.
Figure 8:
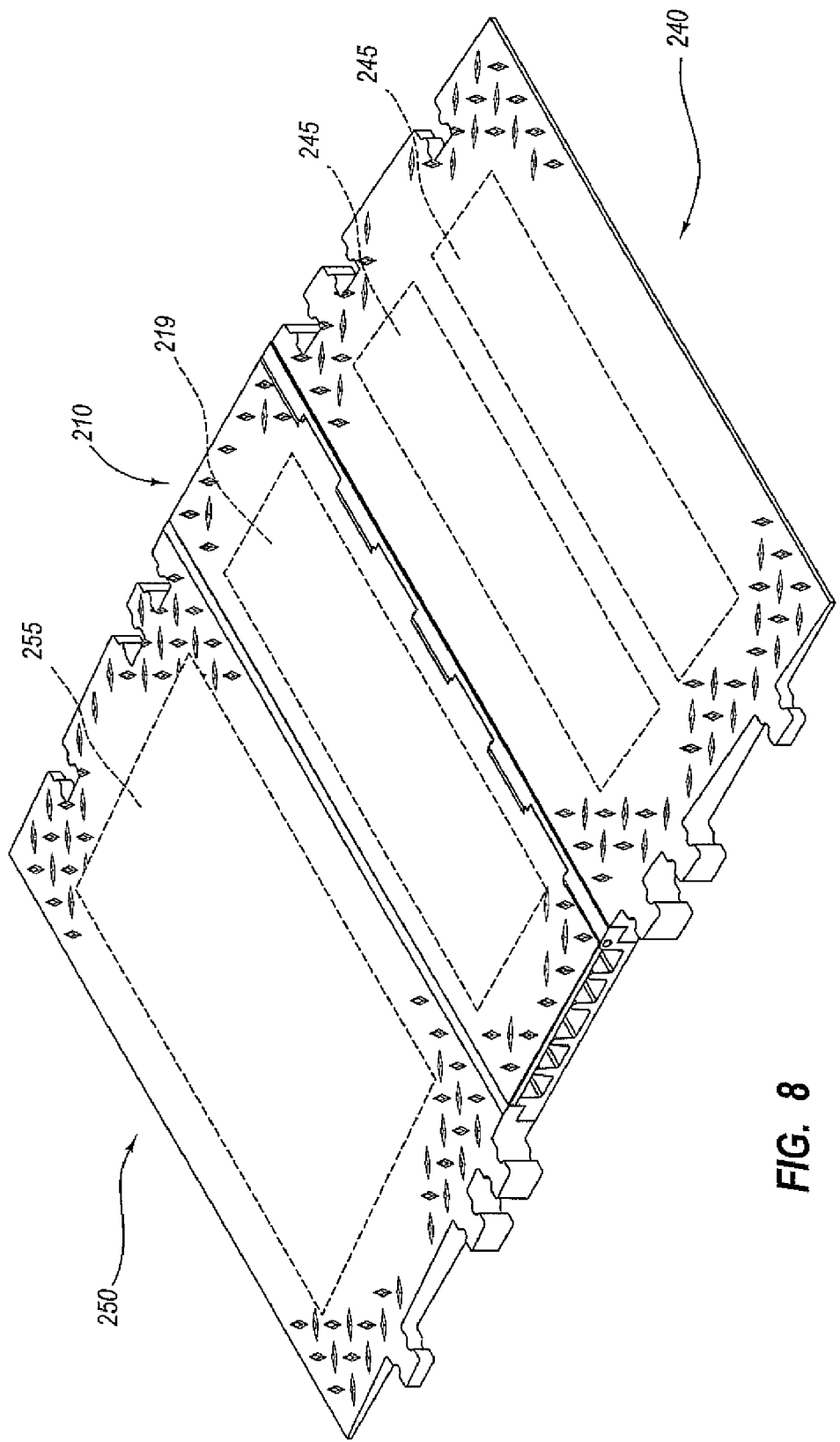
FIG. 8 is a top, assembled perspective view of the exemplary cable protection system illustrated in FIG. 6.

As detailed above, indicia members may be housed within one or more portions of a cable protection system in a variety of ways. For example, a cable protector system may comprise one or more recesses on the underside or bottom surface of the cable protection system for housing one or more indicia members. FIGS. 6-8 are perspective views of an exemplary cable protection system 200 comprising one or more recesses for housing one or more indicia members. As illustrated in these figures, cable protection system 200 may comprise a cable protector 210, a first side ramp 240, and a second side ramp 250.

In this embodiment, cable protector 210 may comprise one or more connectors 232 for removably attaching cable protector 210 to first side ramp 240. Generally speaking, connectors 232 may be formed in any shape capable of interlocking with, or being inserted into, an opposing structure. Examples of connectors 232 include, without limitation, a substantially vertically extending protrusion, a ball-shaped structure capable of interconnecting with a socket to form a ball-and-socket joint, a cantilever configured to "snap fit" into a complimentary recess, or any other suitable connector.

In at least one embodiment, connectors 232 may be insertable into one or more apertures 246 formed in first side ramp 240. Apertures 246 may be formed in any shape capable of receiving the various possible configurations of connectors 232 described in greater detail above. Examples of apertures 246 include, without limitation, a circular socket (capable of interlocking with the ball-shaped embodiment of connector 232), a cubic or rectangular aperture or recess (capable of receiving the substantially vertical protrusion embodiment of connector 232), or any other suitable aperture. Connectors 232 may also be configured to snap fit into apertures 246 defined in first side ramp 240 to removably attach first side ramp 240 to cable protector 210.

In at least one embodiment, cable protector 210 may be removably attached to first side ramp 240 by: 1) elevating cable protector 210; 2) positioning connectors 232 of cable protector 210 directly over apertures 246 defined in first side ramp 240; 3) inserting connectors 232 into apertures 246; and 4) lowering cable protector 210. Additional or alternative methods and/or sequences may also be used to removably attach cable protector 210 to first side ramp 240, particularly in light of the various possible shapes, structures, and configurations of connectors 232 and apertures 246.

As seen in the exemplary embodiments illustrated in FIGS. 6-8, second side ramp 250 may be removably attached to a side of cable protector 210 that opposes first side ramp 240. In this embodiment, second side ramp 250 may comprise one or more connectors 256 for removably attaching second side ramp 250 to cable protector 210. As with connectors 232, connectors 256 may be formed in any shape capable of interlocking with, or being inserted into, an opposing structure. Examples of connectors 256 include, without limitation, a substantially vertically extending protrusion, a ball-shaped structure capable of interconnecting with a socket to form a ball-and-socket joint, a cantilever configured to snap fit into a complimentary recess, or any other suitable connector.

In at least one embodiment, connectors 256 may be insertable into one or more apertures 234 defined in a base member 212 of cable protector 210. As with apertures 246, apertures 234 may be formed in any shape capable of receiving the various possible configurations of connectors 256 described in greater detail above. Examples of apertures 234 include, without limitation, a circular socket (capable of interlocking with the ball-shaped embodiment of connector 256), a cubic or rectangular aperture or recess (capable of receiving the substantially vertical protrusion embodiment of connector 256), or any other suitable aperture. Connectors 256 may also be configured to snap fit into apertures 234 defined in cable protector 210 to removably attach second side ramp 250 to cable protector 210.

In at least one embodiment, second side ramp 250 may be removably attached to cable protector 210 by: 1) elevating second side ramp 250; 2) positioning connectors 256 of second side ramp 250 directly over apertures 234 defined in base member 212 of cable protector 210; 3) inserting connectors 256 into apertures 234; and 4) lowering second side ramp 250. Additional or alternative methods and/or sequences may also be used to removably attach second side ramp 250 to cable protector 210, particularly in light of the various possible shapes, structures, and configurations of connectors 256 and apertures 234.

In certain embodiments, a recess 217 structured to house at least one indicia member (such as indicia member 219) may be provided on the underside or bottom surface of cover structure 218 of cable protector 210, as best illustrated in FIG. 7. Similarly, first side ramp 240 and second side ramp 250 may comprise one or more recesses 243 and 253, respectively, for housing one or more indicia members, such as indicia members 245 and 255. As with cable protection system 100 in FIGS. 1-5, all or at least a portion of cable protector 210, first side ramp 240, and/or second side ramp 250 may be formed of a substantially or at least partially transparent material. In this embodiment, the indicia on indicia members 219, 245, and 255 housed within cable protector 210, first side ramp 240, and second side ramp 250, respectively, may be seen through the substantially or at least partially transparent material used to form cable protector 210, first side ramp 240, and second side ramp 250.

Although the various cable protectors embodiments described and illustrated herein show a cover structure pivotally attached to a base member, various alternative arrangements and configurations fall within the scope of the instant disclosure. For example, the cover structure may be snap fit or otherwise removably attached to the base member. Alternatively, the cable protector may comprise a unitary base member/cover structure having an open base defining a single channel for covering one or more cables. For example, as illustrated in FIGS. 9-10, a cable protector 310 may comprise a cover structure 318 unitarily formed on the upper surface of a pair of opposing side walls 313. In this embodiment, cover structure 318 and opposing side walls 313 may define a single channel 316 for housing one or more cables. Additionally or alternatively, one or more vertically extending rib members may longitudinally divide the length of cable protector 310 into a plurality of longitudinal channels for housing one or more cables. Cable protector 310 may also comprise one or more connectors 332 and/or apertures 334 for facilitating the side-by-side or end-to-end connection of additional ramps or cable protectors.

As with cable protection systems 100 and 200 in FIGS. 1-8, cable protector 310 may comprise a slot (such as slot 317 in FIGS. 9-10) or a recess for housing one or more indicia members. Cable protector 310 may also be formed of a substantially or at least partially transparent material so that at least a portion of the indicia on an indicia member housed within cable protector 310 may be seen through the substantially or at least partially transparent material of cable protector 310.

Figure 11:
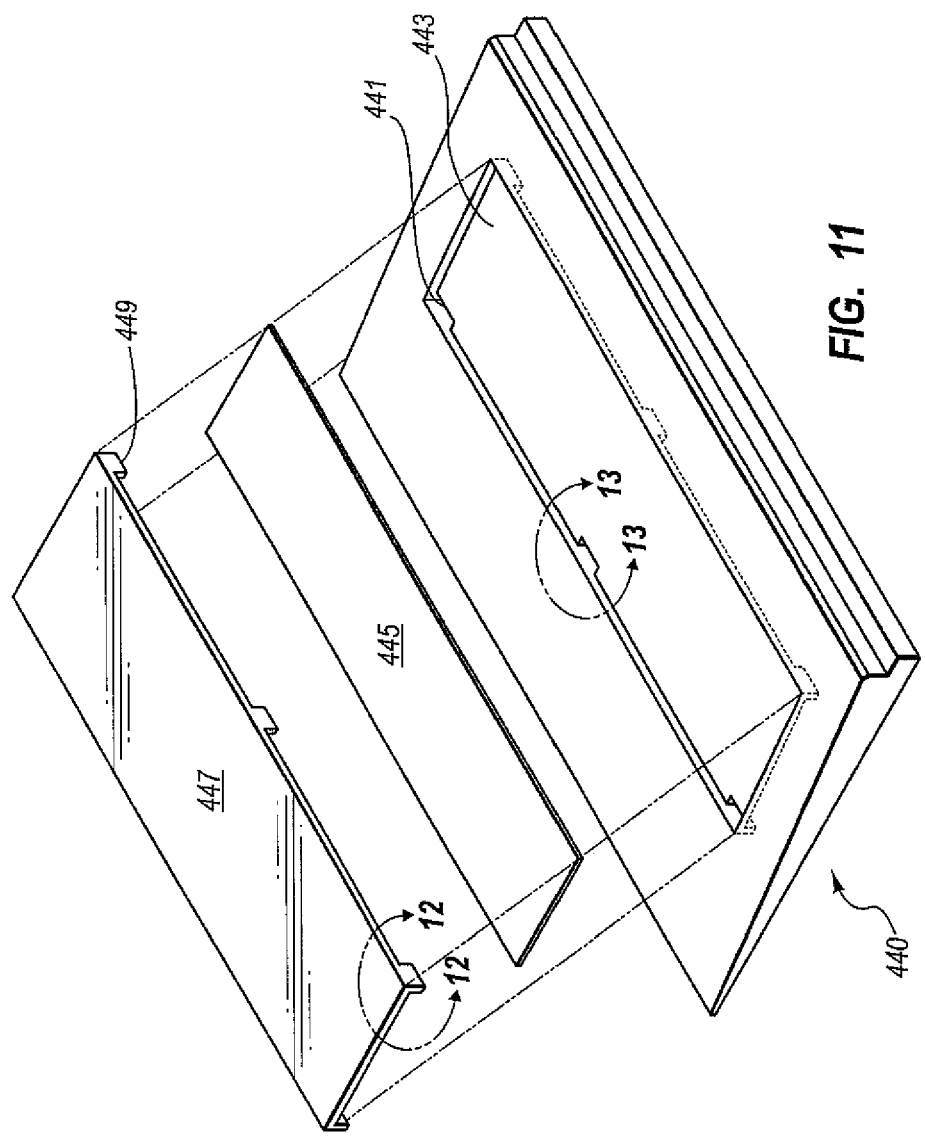
FIG. 11 is a perspective view of an alternative cable protector according to at least one embodiment.

In an additional embodiment, an indicia member may be disposed between an indicia-covering structure and at least a portion of a cable protector (or at least a portion of a side ramp integrally formed with or removably attached thereto). For example, as illustrated in FIG. 11, an indicia member 445 may be disposed between a indicia-covering structure 447 and a top surface of a first side ramp 440. In this example, indicia member 445 may be housed within a recess 443 defined within first side ramp 440 by removably attaching indicia-covering structure 447 to first side ramp 440.

Figure 12:
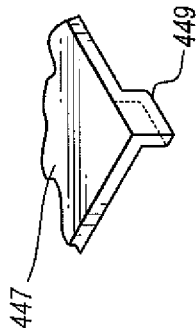
FIG. 12 is a perspective view of a connector for connecting a transparent cover structure to the cable protector illustrated in FIG. 11.
Figure 13:
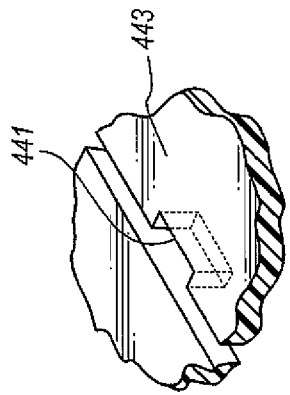
FIG. 13 is a perspective view of an aperture for receiving the connector illustrated in FIG. 12.

Indicia-covering structure 447 may be removably attached to first side ramp 440 in a variety of ways. For example, as illustrated in FIGS. 11-13, indicia-covering structure 447 may comprise one or more connectors 449 structured to be insertable into one or more apertures 441 defined in first side ramp 440 to removably attach indicia-covering structure 447 to first side ramp 440.

In one example, a coupling structure may be formed on an inner surface of connector 449 and configured to "snap fit" into a complimentary-shaped coupling recess defined along the inner surface of aperture 441. In this example, the coupling recess may be defined to have a shape that generally embodies the inverse of the shape of the coupling structure. For example, the coupling structure may be configured as a substantially semi-circular protuberance, while the coupling recess may be defined as a substantially semi-circular recess. Accordingly, when connector 449 is inserted into aperture 441, the coupling structure of connector 449 may slidably engage (or snap fit into) the coupling recess defined within aperture 441 to facilitate retention of connector 449 in aperture 441.

In certain embodiments, all or at least a portion of first side ramp 440 may be formed of a substantially or at least partially transparent material. For example, indicia-covering structure 447 may be formed of a substantially or at least partially transparent material. In this embodiment, the indicia on indicia member 445 disposed between indicia-covering structure 447 and first side ramp 440 may be seen through the substantially or at least partially transparent material used to form indicia-covering structure 447.

As detailed above, indicia members may be disposed or housed within one or more portions of a cable protection system in a variety of ways. For example, although not illustrated, in certain examples indicia may be printed on the underside of an at least partially transparent portion of a cable protector. In this example, the printed indicia may be seen through the transparent portion of the cable protector.

Although the various elements of the exemplary cable protection systems illustrated in FIGS. 1-13 have been described and illustrated with a certain degree of particularity, each element in these exemplary systems may be formed in any number of suitable shapes and sizes. For example, one or more of the elements described and illustrated in FIGS. 1-13 may be integrally formed with, as opposed to being removably attached to, one another. For example, one or more of the side ramps described and/or illustrated herein may be integrally formed with, as opposed to being removably attachable to, one or more of the exemplary cable protectors described and/or illustrated herein.

The exemplary cable protection systems and ramp structures illustrated in FIGS. 1-13 may also be adapted to house any number of cables and/or to extend over roadways and walkways of varying lengths. For example, any number of cable protectors in these exemplary systems may be removably attached together in a side-by-side fashion so as to house greater or lesser numbers of cables. Specifically, connectors formed on the side of a first cable protector may be removably inserted into apertures defined in the side of a second cable protector to removably attach the two cable protectors together in a side-by-side fashion. Additional cable protectors may be attached to either side of this assembly to increase the cable-housing capacity of the system as needed.

Similarly, any number of cable protectors may be removably attached together in an end-to-end fashion to extend the cable protection system across roadways or walkways of varying widths. For example, one or more cable protectors may be removably attached together in an end-to-end fashion by one or more ramps. Additionally or alternatively, cable protectors may be removably attached together in an end-to-end fashion using one or more end connectors provided on opposing ends of the cable protectors. As will be appreciated by those of skill in the art, mixing and matching the various "building blocks" of these exemplary cable protection systems in this manner enables a user to form a system capable of housing any number of cables and/or extending over roadways and walkways of varying lengths. The flexibility of the system as a whole is thus increased, resulting in greater ease of use and interchangeability of parts.

In addition, although the various cable protector embodiments illustrated herein have been described as having one or more connectors formed on a first side of the base member and one or more apertures formed on an opposing side of the base member, various alternative arrangements and configurations fall within the scope of the instant disclosure. For example, the base members may be formed with connectors on both sides, or may have apertures defined in each of its sides. Similarly, the base members may be formed such that a connector is formed on the same side as an aperture.

The elements of the exemplary cable protection systems described and/or illustrated herein may also be formed of any material or combination of materials. For example, the cable protectors and side ramps described and illustrated herein may be molded of a rigid, high-strength plastic material capable of withstanding repeated loadings and stresses. In addition, plastic plating or gripping may be formed on the upper surfaces of one or more of these elements, as illustrated in FIGS. 1-13, to improve traction for pedestrians or vehicles traveling over the cable protection system.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A cable protector, comprising:
   an at least partially transparent base member;
   at least one channel extending between opposing ends of the base member and structured to house at least one cable;
   an indicia member positioned within the base member so as to be visible through at least a portion of the base member.

2. The cable protector of claim 1, further comprising an at least partially transparent cover structure pivotally attached to the base member, the cover structure comprising at least one of:
   a slot for housing the indicia member;
   a recess in a bottom surface of the cover structure for housing the indicia member.

3. The cable protector of claim 1, further comprising:
   a cover structure pivotally attached to the base member;
   a recess in a top surface of the cover structure for housing the indicia member;
   an at least partially transparent indicia-covering structure removably attached to the top surface of the cover structure for retaining the indicia member within the recess in the cover structure.

4. The cable protector of claim 1, further comprising an at least partially transparent side ramp, the side ramp comprising at least one of:
   a slot for housing the indicia member;
   a recess in a bottom surface of the side ramp for housing the indicia member.

5. The cable protector of claim 1, further comprising:
   a side ramp;
   a recess in a top surface of the side ramp for housing the indicia member;
   an at least partially transparent indicia-covering structure removably attached to the top surface of the side ramp for retaining the indicia member within the recess in the side ramp.

6. The cable protector of claim 4, wherein the side ramp is removably attached to the base member.

7. The cable protector of claim 4, wherein the side ramp is integrally formed with the base member.

8. The cable protector of claim 1, wherein the base member comprises at least one of:
   a slot for housing the indicia member;
   a recess in a bottom surface of the base member for housing the indicia member.

9. The cable protector of claim 1, wherein the base member comprises:
   a recess in a top surface of the base member for housing the indicia member;
   an at least partially transparent indicia-covering structure removably attached to the top surface of the base member for retaining the indicia member within the recess in the base member.

10. The cable protector of claim 1, wherein the indicia member is affixed to or printed on a bottom surface of the base member.

11. The cable protector of claim 1, wherein the indicia member comprises at least one of:
   advertising indicia;
   indicia that indicates at least a product name of the cable protector;
   indicia that indicates a manufacturer of the cable protector.

12. A side ramp structured to be removably attachable to a side of a cable protector, the side ramp comprising:
   an at least partially transparent material;
   a first side, a second side, a first end, and a second end;
   an indicia member positioned within the side member so as to be visible through at least a portion of the partially transparent material.

13. The side ramp of claim 12, further comprising a slot in the side ramp for housing the indicia member.

14. The side ramp of claim 12, further comprising a recess in a bottom surface of the side ramp for housing the indicia member.

15. The side ramp of claim 12, further comprising:
   a recess in a top surface of the side ramp for housing the indicia member;
   an at least partially transparent indicia-covering structure removably attached to the top surface of the side ramp for retaining the indicia member within the recess in the side ramp.

16. A cable protection system, comprising:
   at least one substantially transparent cable protector;
   at least one channel extending between opposing ends of the cable protector and structured to receive at least one cable;
   at least one substantially transparent side ramp removably attached to the cable protector;
   an advertising indicia member positioned within at least one of the cable protector and the side ramp so as to be visible through at least a portion of at least one of the cable protector and the side ramp.

17. The cable protection system of claim 16, wherein the side ramp comprises at least one of:
   a slot for housing the indicia member;
   a recess in a bottom surface of the side ramp for housing the indicia member.

18. The cable protection system of claim 16, wherein the side ramp comprises at least one of:
   a recess in a top surface of the side ramp for housing the indicia member;
   a substantially transparent indicia-covering structure removably attached to the top surface of the side ramp for retaining the indicia member within the recess in the side ramp.

19. The cable protection system of claim 16, wherein the cable protector comprises an at least partially transparent cover structure pivotally attached to the cable protector, the cover structure comprising at least one of:
   a slot for housing the indicia member;
   a recess in a bottom surface of the cover structure for housing the indicia member;
   a recess in a top surface of the cover structure for housing the indicia member;
   an at least partially transparent indicia-covering structure removably attached to the top surface of the cover structure for retaining the indicia member within the recess in the top surface of the cover structure.

20. The cable protection system of claim 16, wherein the cable protector comprises an at least partially transparent base member, the base member comprising at least one of:
   a slot for housing the indicia member;
   a recess in a bottom surface of the base member for housing the indicia member;
   a recess in a top surface of the base member for housing the indicia member;
   an at least partially transparent indicia-covering structure removably attached to the top surface of the base member for retaining the indicia member within the recess in the top surface of the base member.

21. A cable protector, comprising:
   a base member;
   at least one channel extending between opposing ends of the base member and structured to house at least one cable;
   an at least partially transparent cover structure attached to the base member;
   an advertising indicia member visible through at least a portion of the cover structure.

22. The cable protector of claim 21, wherein the cover structure is pivotally attached to the base member.

23. The cable protector of claim 22, wherein the cover structure includes a slot for housing the indicia member.

24. The cable protector of claim 23, wherein the slot is accessible along a side edge of the cover structure.

25. The cable protector of claim 21, wherein the cover structure includes a recess in a bottom surface of the cover structure for housing the indicia member.

26. The cable protector of claim 21, wherein the cover structure comprises:
   a recess in a top surface of the cover structure for housing the indicia member;
   an at least partially transparent indicia-covering structure removably attached to the top surface of the cover structure for retaining the indicia member within the recess in the cover structure.

27. The cable protector of claim 21, wherein the indicia member is affixed to or printed on a surface of the cover structure.

28. The cable protector of claim 21, wherein the indicia member comprises at least one of:
   indicia that indicates at least a product name of the cable protector;
   indicia that indicates a manufacturer of the cable protector.

29. A cable protection system, comprising:
   at least one cable protector, the cable protector including:
      at least one transparent portion;
      at least one channel extending between opposing ends of the cable protector and structured to receive at least one cable;
   at least one side ramp removably attached to the cable protector;
   an advertising indicia member visible through the transparent portion of the cable protector.

30. The cable protection system of claim 29, wherein the cable protector includes a slot for housing the indicia member.

31. The cable protection system of claim 29, wherein the cable protector comprises a base member and a cover structure attached to the base member, the cover structure defining the transparent portion.

32. The cable protection system of claim 31, wherein the cover structure includes a slot for housing the indicia member, the slot being accessible along a side edge of the cover structure.

33. The cable protection system of claim 29, wherein the cable protector includes at least one of:
a recess in a bottom surface of the cover structure for housing the indicia member;
a recess in a top surface of the cover structure for housing the indicia member;
an at least partially transparent indicia-covering structure removably attached to the top surface of the cover structure for retaining the indicia member within the recess in the top surface of the cover structure.

34. A cable protector, comprising:
a base member;
at least one channel extending between opposing ends of the base member and structured to house at least one cable;
an at least partially transparent cover structure pivotally attached to the base member;
an indicia member visible through at least a portion of the cover structure;
wherein the cover structure includes a slot for housing the indicia member, the slot being accessible along a side edge of the cover structure.

35. The cable protector of claim 34, wherein the indicia member comprises at least one of:
advertising indicia;
indicia that indicates at least a product name of the cable protector;
indicia that indicates a manufacturer of the cable protector.

36. A cable protection system, comprising:
at least one cable protector, the cable protector including:
at least one transparent portion;
at least one channel extending between opposing ends of the cable protector and structured to receive at least one cable;
at least one side ramp removably attached to the cable protector;
an indicia member visible through the transparent portion of the cable protector;
wherein the cable protector comprises a base member and a cover structure attached to the base member, the cover structure defining the transparent portion;
wherein the cover structure includes a slot for housing the indicia member, the slot being accessible along a side edge of the cover structure.

37. A transparent cable protection system, comprising:
a transparent cable protector having a base and a cover pivotally attached to the base, the base defining at least one channel extending between opposing ends of the cable protector and structured to receive at least one cable;
transparent first and second side ramps removably attached to opposing sides of the cable protector;
an advertising indicia member positioned within at least one of the cable protector and the first and second side ramps so as to be visible through at least a portion of at least one of the cable protector and the first and second side ramps.

38. The transparent cable protector system of claim 37, further comprising at least one of:
a slot for housing the indicia member;
a recess for housing the indicia member.

39. The transparent cable protector system of claim 38, wherein the slot is accessible along a side edge of one of the cover and the first and second ramps.

40. The transparent cable protector system of claim 38, wherein the recess is formed in a top surface of one of the cover and the first and second ramps, the transparent cable protector system further comprising an at least partially transparent indicia-covering structure configured to retain the indicia member within the recess.

* * * * *